United States Patent [19]

Smith

[11] Patent Number: 5,482,239
[45] Date of Patent: Jan. 9, 1996

[54] PORTABLE ATTACHMENT BAR FOR ATTACHING AN INTRAVENOUS CONTAINER SUPPORT APPARATUS TO A PATIENT TRANSPORTATION APPARATUS

[76] Inventor: K. C. Smith, 2011 11th St., Bay City, Mich. 48708

[21] Appl. No.: 304,120

[22] Filed: Sep. 12, 1994

[51] Int. Cl.⁶ .......................... A47B 96/06; A47C 7/62
[52] U.S. Cl. .................. 248/229.13; 248/298.1
[58] Field of Search ................... 248/229, 230, 248/298, 279, 271, 286, 316.5; 297/188.01, 188.06, 188.05, 188.18, 188.2

[56] References Cited

U.S. PATENT DOCUMENTS

| | | | |
|---|---|---|---|
| 2,535,112 | 12/1950 | Woody | 248/230 |
| 2,696,963 | 12/1954 | Shepherd | 248/229 |
| 3,709,556 | 1/1973 | Allard et al. | 297/188.2 |
| 4,431,206 | 2/1984 | Pryor | 297/188.06 |
| 4,511,157 | 4/1985 | Wilt, Jr. | 297/188.2 |
| 4,511,158 | 4/1985 | Varga et al. | 297/188.2 |
| 4,572,536 | 2/1986 | Doughty | 297/188.2 |
| 4,629,074 | 12/1986 | Toder | 211/71 |
| 4,744,536 | 5/1988 | Bamcalari | 248/125 |
| 4,767,131 | 8/1988 | Springer et al. | 297/188.2 |
| 4,832,294 | 5/1989 | Eidem | 248/125 |

*Primary Examiner*—Leslie A. Braun
*Assistant Examiner*—Anita M. King
*Attorney, Agent, or Firm*—Kevin A. Sembrat

[57] ABSTRACT

An attachment device is provided wherein the device is designed to connect intravenous container support apparatus to various medical transport and patient care devices such as wheelchairs, hospital-style beds, transport carts for emergency room and outpatient use, and ambulance cots. This attachment device ensures that the intravenous container support apparatus that is hooked to a patient in the medical transport apparatus is not pulled away from the patient, thereby preventing dislodged intravenous lines that may otherwise result in dangerous conditions for the patient. The present invention is constructed of materials that meet or exceed health regulations, such as a lightweight metal alloy. The present invention is adjustable to accommodate various transportation apparatus, and the present invention includes clamping means which permits quick and efficient attachment to and detachment from the transportation apparatus.

18 Claims, 5 Drawing Sheets

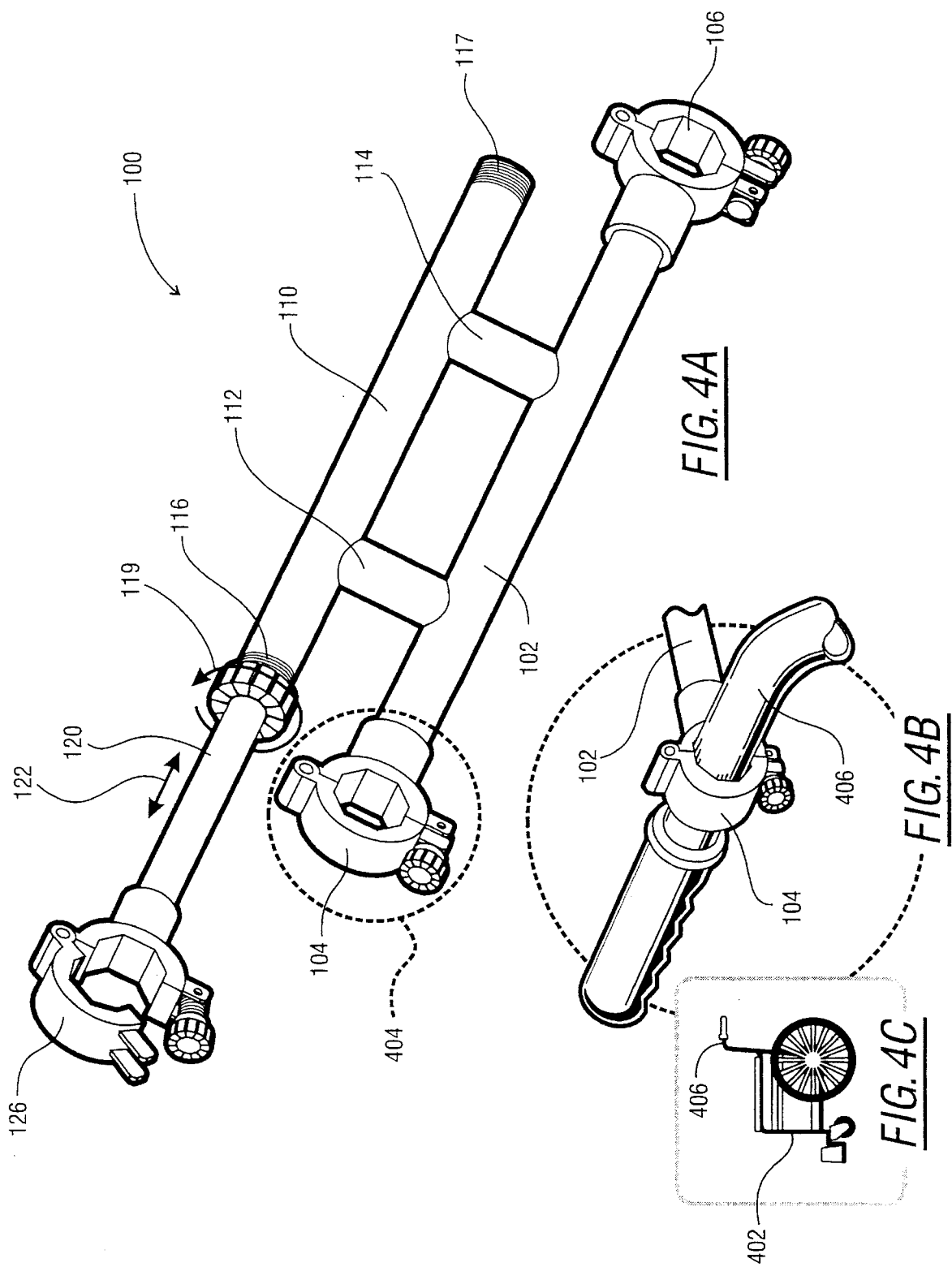

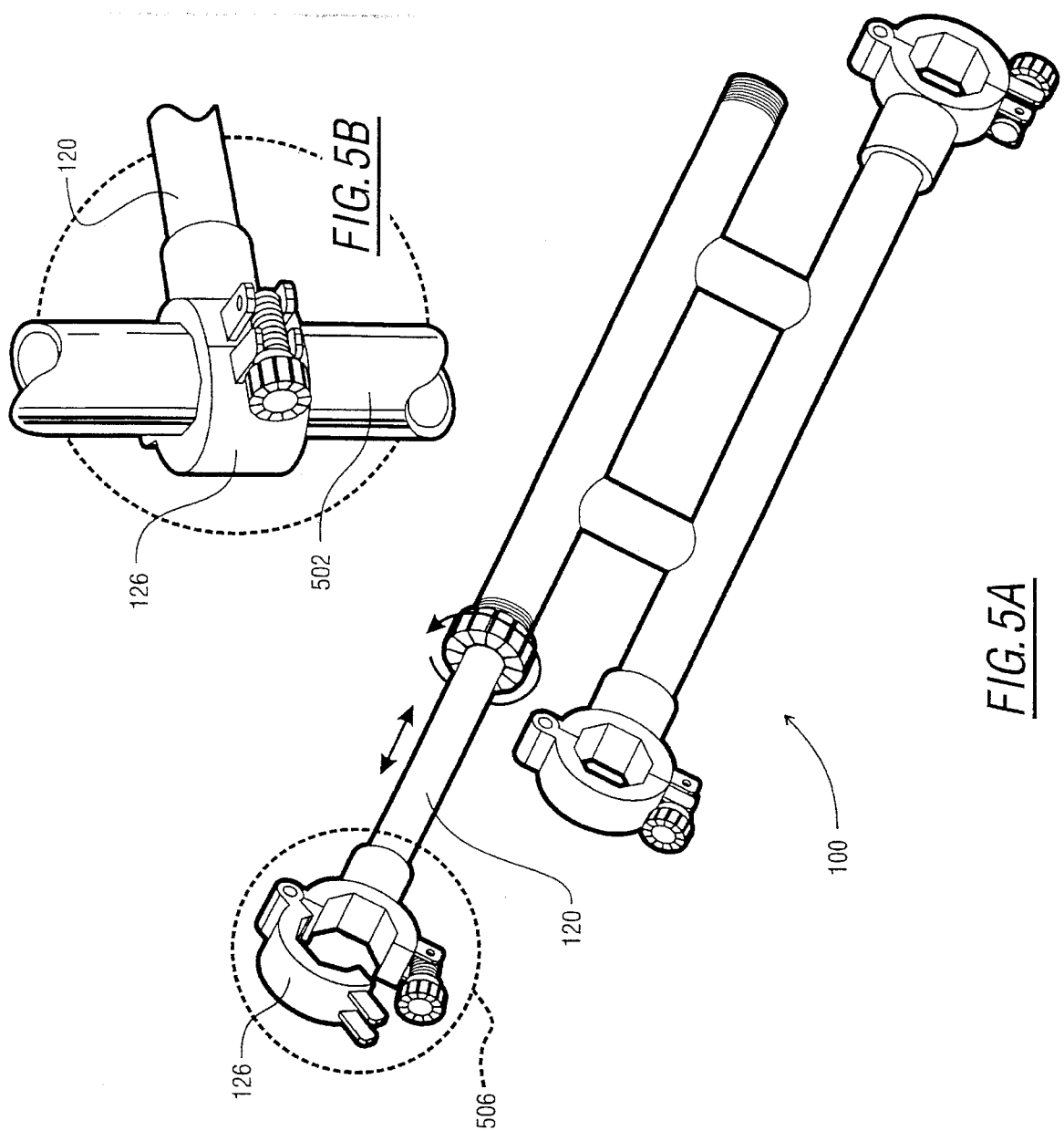

PORTABLE ATTACHMENT BAR FOR ATTACHING AN INTRAVENOUS CONTAINER SUPPORT APPARATUS TO A PATIENT TRANSPORTATION APPARATUS

BACKGROUND OF THE INVENTION

1. Field of the Invention

The present invention relates generally to patient transportation apparatus for patients requiring intravenous container support apparatus and, more particularly, to removably securing an intravenous container support apparatus to a patient transportation apparatus.

2. Description of the Related Art

In the health care profession in general, and in hospitals in particular, a patient, who must keep an intravenous fluid container attached to her body, frequently must be transported from one location to another. This transport is typically accomplished with a patient transportation apparatus, such as a wheelchair or a hospital-type bed, for example. Typically, at least one hospital personnel member pushes the patient in the wheelchair or bed, and at least one other hospital personnel member ensures that the intravenous fluid container remains in a safe position relative to the patient. The intravenous fluid container is typically supported by the personnel member or a mobile carrier that is detached from the wheelchair or bed. Otherwise, the intravenous fluid container is supported by carrier that is specifically designed to be fixedly attached to a particular transportation apparatus, which minimizes the flexibility to use the specifically designed carrier with different transportation apparatus. These carriers and supports are prone to being overturned or otherwise being jolted or pulled away from the patient, thereby resulting in dislodged intravenous lines that present potential unsafe conditions for the patient. Typically, the additional personnel are required to prevent the carriers or supports from being overturned or otherwise jolted or pulled away from the patient.

Consequently, a need has been felt for providing an attachment device which overcomes the problems of requiring additional personnel to prevent the pulling away of a detached intravenous container carrier from a patient, who must keep the intravenous container attached to her body, wherein the device is quickly and easily transferable to a variety of different hospital transportation apparatus.

SUMMARY OF THE INVENTION

It is therefore an object of the present invention to provide an improved attachment bar for attaching an intravenous container support apparatus to a patient transportation apparatus.

It is a feature of the present invention to be adjustable to accommodate a variety of different hospital transportation apparatus.

It is another feature of the present invention to be constructed of materials that meet or exceed health care regulations, typically a lightweight metal alloy.

It is another feature of the present invention to include a telescopically slidable adjustment bar that is rotatable for maximum degrees of attachment flexibility.

Briefly described according to one embodiment of the present invention, an attachment device is provided wherein the device is designed to connect intravenous container support apparatus to various medical transport and patient care devices such as wheelchairs, hospital-style beds, transport carts for emergency room and outpatient use, and ambulance cots. This attachment device ensures that the intravenous container support apparatus that is hooked to a patient in the medical transport apparatus is not pulled away from the patient, thereby preventing dislodged intravenous lines that may otherwise result in dangerous conditions for the patient. The present invention is constructed of materials that meet or exceed health regulations, such as a lightweight metal alloy. The present invention is adjustable to accommodate various transportation apparatus, and the present invention includes clamping means which permits quick and efficient attachment to and detachment from the transportation apparatus.

In accordance with a preferred embodiment, an attachment device is provided for removably securing an intravenous container support apparatus to a patient transportation apparatus, wherein the attachment device comprises: a main support member having a main first end and a main second end; a secondary support member fixedly attached in parallel to the main support member at a central position, wherein the secondary support member has a secondary first end and a secondary second end; a tertiary support member that is telescopically slidable within the secondary support member; main clamping means for removably clamping the main support member to the patient transportation apparatus, wherein the main clamping means is fixedly attached to the first end and to the main second end; secondary clamping means for adjustably clamping the tertiary support member into a fixed position within the secondary support member; and tertiary clamping means for removably clamping the portable intravenous container support apparatus to the tertiary support member.

An advantage of the present invention is that it can accommodate intravenous container support apparatus positioned on the right and left side of a wheelchair or other transportation apparatus.

Another advantage of the present invention is that intravenous containers that become dislodged from the patient are minimized, thereby helping to save lives by preventing uncontrollable bleeding and other dangerous conditions that otherwise may result from a dislodged intravenous container.

Another advantage of the present invention is that fewer personnel are required to safely transport a patient with an intravenous hook-up from one location to another.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a perspective view of the attachment bar of FIG. 1, with an enlarged view showing attachment of a clamp of the present invention to the handle of a wheelchair; and FIG. 5 is a perspective view of the attachment bar of FIG. 1, with an enlarged view showing attachment of a clamp of the present invention to an intravenous container support apparatus.

DESCRIPTION OF THE PREFERRED EMBODIMENTS

1. Detailed Description of the Fibres

Figure 1:
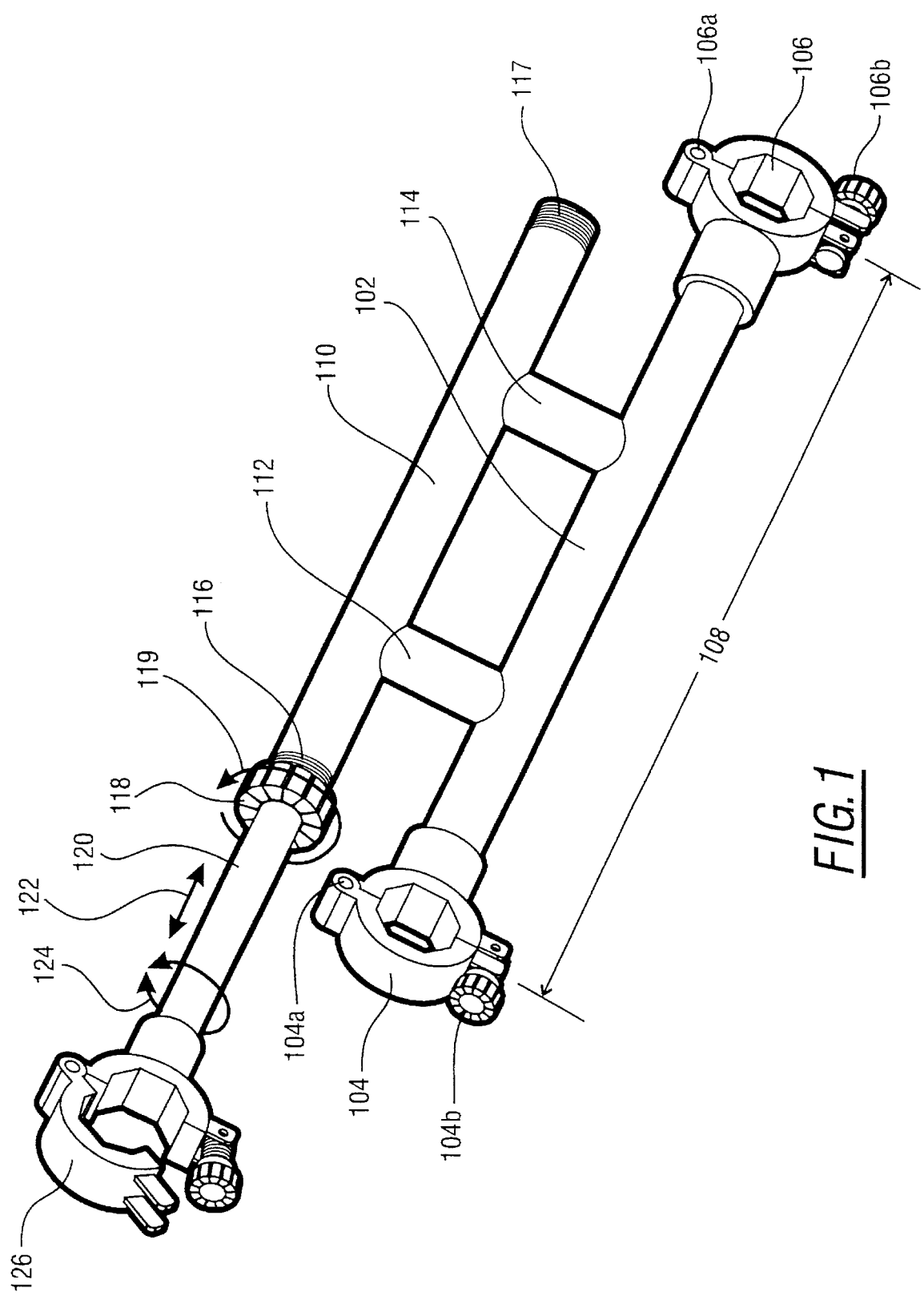
FIG. 1 is a perspective view of an attachment bar with a fixed length main crossbar, according to a preferred embodiment of the present invention.

Referring now to FIG. 1, an attachment bar 100 is shown, according to the present invention. The attachment bar 100 has a main crossbar 102, preferably tubular in shape, with a clamp 104 fixedly attached to a first end and a clamp 106 fixedly attached to a second end. A preferred embodiment of the clamp 104, 106 is a specially adapted C-clamp, which is hinged to open and close about a hinge pin 104a, 106a, respectively, and is secured with a thumbscrew 104b, 106b, as shown in FIG. 1. One skilled in the art will recognize that other clamping and securing means may be utilized for maximum attachment possibilities.

A preferred embodiment of the main crossbar 102 and the clamps 104, 106 defines an attachment distance 108, preferably approximating the width of a patient transportation device, such as a wheelchair or a hospital-style bed, for example, between the clamps 104, 106.

A secondary crossbar 110, also preferably tubular in shape, is attached in parallel to the main crossbar 102 with extension bars 112 and 114, which are typically located towards a central portion of the main crossbar 102 and the secondary crossbar 110. In a preferred embodiment of the present invention, the main crossbar 102 is removable from the extension bars 112 and 114, in order that the secondary crossbar 110 may be attached to the transportation device absent the main crossbar 102, with U-shaped bolts and metal plates which are commonly known in the art. A typical metal plate is 6 square inches by 0.25 inches thick and attaches to a transportation device in order to receive a U-shaped bolt or other clamp.

Each of the ends of the secondary crossbar 110 has threads 116 and 117 to receive a compression nut 118. Turning the compression nut 118 in a counterclockwise direction, as shown by a counterclockwise arrow 119, will loosen the compression nut 118 from the threads 116 in a manner well-known in the art. Turning the compression nut 118 in a clockwise direction will tighten the compression nut 118 onto the threads 116 and thereby will compress the tightened end of the secondary crossbar 110. The compression nut 118 may alternatively be tightened onto the threads 117. Alternatively, a second compression nut (not shown) may be tightened onto the threads 117.

The first end with the threads 116 on the secondary crossbar 110 receives, through the compression nut 118, a first end of a tertiary crossbar 120. The tertiary crossbar 120 is preferably tubular in shape and of smaller diameter than the secondary crossbar 110. Prior to tightening the compression nut 118 onto the threads 116, the tertiary crossbar is telescopically slidable within the secondary crossbar 110, as shown by a longitudinal arrow 122. In this manner, the tertiary crossbar 120 is adjustable to a plurality of lengths relative to the secondary crossbar 110.

Additionally, the tertiary crossbar 120 is rotatable within the secondary crossbar 110. In this manner, as shown by a rotational arrow 124, the tertiary crossbar is rotatably adjustable about the axis of the secondary crossbar 120 for a full range of 360 degrees. The compression nut 118 may be tightened onto the threads 116 to compress the secondary crossbar against the tertiary crossbar 120, thereby to restrict the slidable and rotatable adjustable positioning of the tertiary crossbar 120 to a fixed position relative to the secondary crossbar 110.

Alternatively, the second end with the threads 117 on the secondary crossbar 110 may receive, through the compression nut 118, the first end of the tertiary crossbar 120, thereby to position the tertiary crossbar 120 on an opposing side of the secondary crossbar 110. The compression nut 118 may be tightened onto the threads 117 to compress the secondary crossbar against the tertiary crossbar 120, thereby to restrict the slidable and rotatable adjustable positioning of the tertiary crossbar 120 to a fixed position relative to the secondary crossbar 110. As mentioned above, a second compression nut (not shown) may be threaded onto the threads 117 to protect the threads 117 and to eliminate switching the compression nut 118 between the threads 116 and the threads 117 when the tertiary crossbar 120 is moved back and forth from the compression nut 118 to the second compression nut (not shown).

A clamp 126, which is preferably similar in operation to the clamps 104 and 106, is fixedly attached to a second end of the tertiary crossbar 120. The clamp 126 is shown in an open position, ready to receive and to secure in a clamping manner an apparatus such as an intravenous container support apparatus (see FIG. 4).

A preferred embodiment of the main crossbar 102, the secondary crossbar 110, the extension bars 112, 114 and the tertiary crossbar 112 is cylindrical tubes which are hollow and manufactured of materials that meet or exceed health care regulations, usually a lightweight metal alloy such as aluminum or stainless steel, for example.

Figure 2:
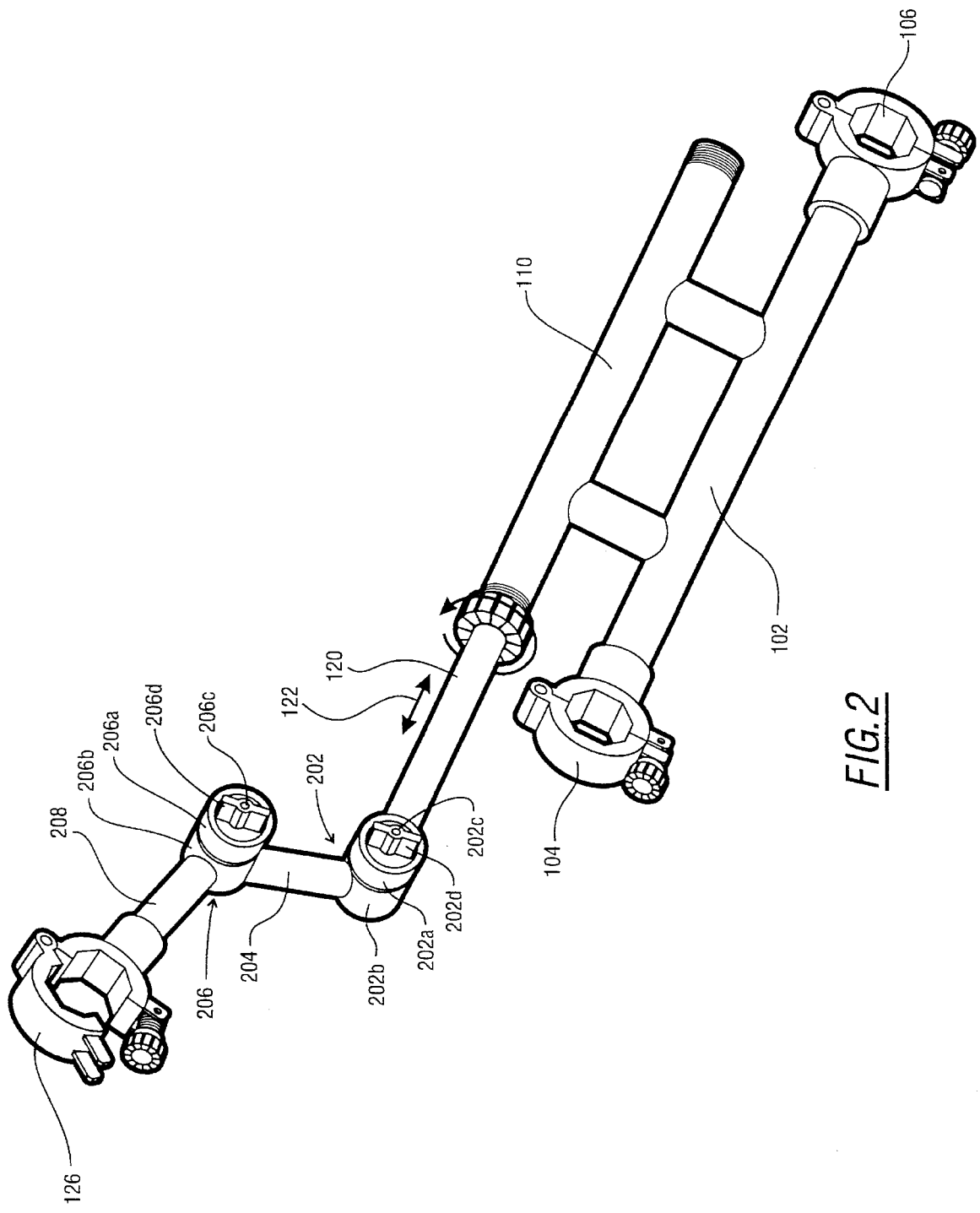
FIG. 2 is a perspective view of the attachment bar of FIG. 1, with a tertiary crossbar comprising adjustable brackets for angle adjustments, according to a preferred embodiment of the present invention.

As shown in FIG. 2, a preferred embodiment of the present invention modifies the tertiary crossbar 120 to be attached to a first joint 202, which is attached to a first subcrossbar 204, which is attached to a second joint 206, which is attached to a second subcrossbar 208, onto which is attached the clamp 126. A preferred embodiment of the first joint 202 and the second joint 206 is well-known in the art. In a preferred embodiment, the first joint 202 includes a plate 202a which is attached to the tertiary crossbar 120, and a plate 202b, which is attached to the first subcrossbar 204. The plates 202a and 202b are held together in rotatable cooperation about a bolt 202c. In this manner, the first subcrossbar 204 is rotatably adjustable relative to the tertiary crossbar 120, thereby to adjust the angle between the first subcrossbar 204 and the tertiary crossbar 120. When a desired angle is achieved, the plates 202a and 202b may be tightened against each other with a wingnut 202d, which is threaded onto the bolt 202c, thereby to fixedly maintain a desired angle between the first subcrossbar 204 and the tertiary crossbar 120.

Similarly, the second joint 206 includes a plate 206a which is attached to the first subcrossbar 204, and a plate 20bb, which is attached to the second subcrossbar 208. The plates 206a and 206b are held together in rotatable cooperation about a bolt 206c. In this manner, the second subcrossbar 208, onto which is attached the clamp 126, is rotatably adjustable relative to the first subcrossbar 204, thereby to adjust the angle between the second subcrossbar 208 and the first subcrossbar 204. When a desired angle is achieved, particularly for the clamp 126, the plates 206a and 206b may be tightened against each other with a wingnut 206d, which is threaded onto the bolt 206c, thereby to fixedly maintain a desired angle between the second subcrossbar 208 and the first subcrossbar 204.

One skilled in the art will recognize that a plurality of joints may be utilized in this manner. As such, in combination with the 360 degree full range of rotable adjustment of the tertiary crossbar 120, the first joint 202 and the second joint 206 provides angle adjustment of the clamp 126 for all degrees of movement. For instance, the clamp 126 may be angled and rotated relative to a horizontal secondary crossbar 110, which is attached to an angled platform of a hospital bed, thereby to permit the clamp 126 to support a vertical pole of an intravenous container support apparatus (see FIG. 5). Alternatively, the clamp 126 may be angled under the transportation device for storage purposes.

Figure 3:
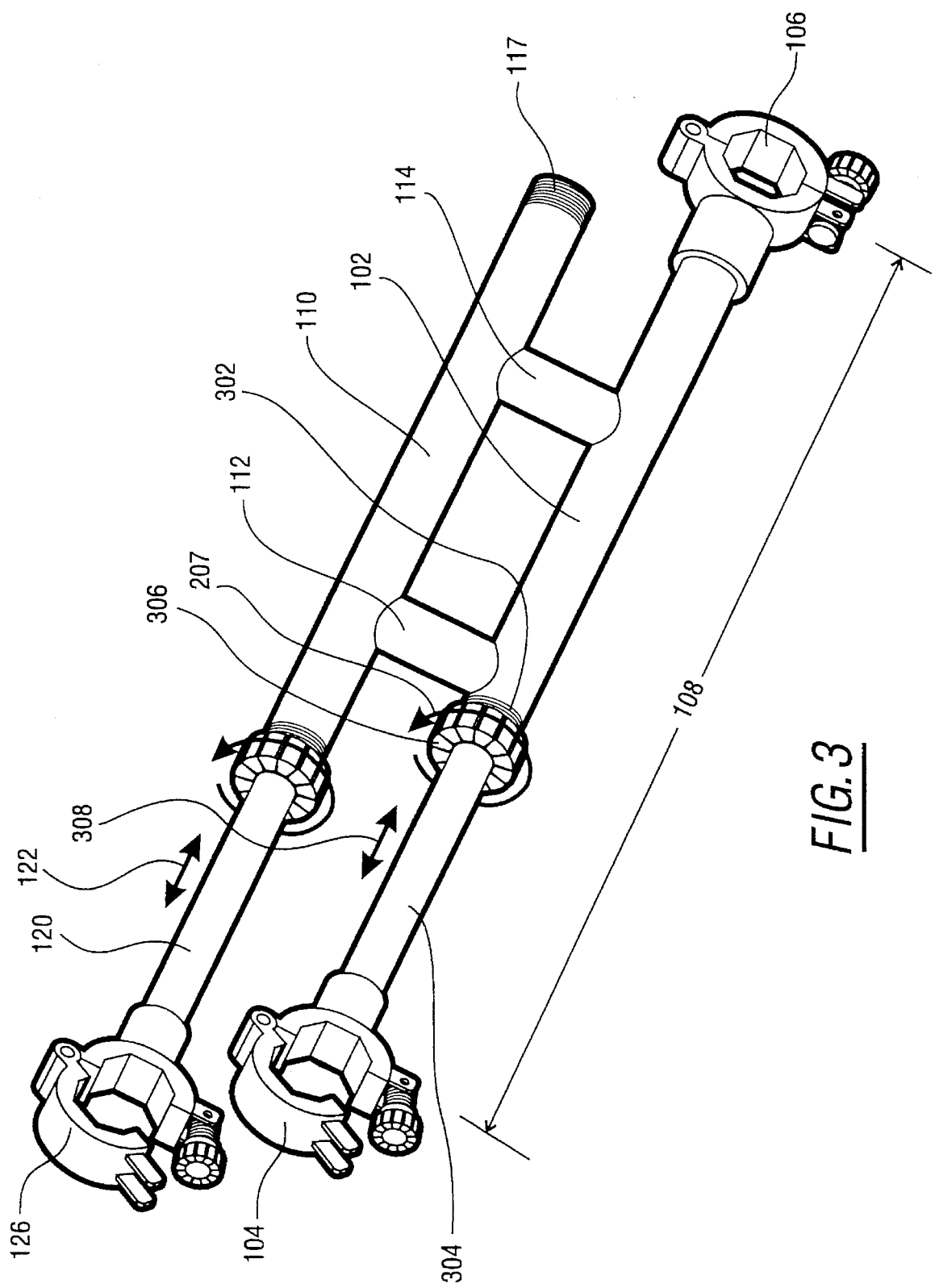
FIG. 3 is a perspective view of an attachment bar with an adjustable length main crossbar, according to a preferred embodiment of the present invention.

As shown in FIG. 3, a preferred embodiment of the present invention modifies the main crossbar 102 with threads 302 on one end, thereby to receive a fourth crossbar 304 and a compression nut 306, similar to the manner in which the threads 116 on the secondary crossbar 110 receive the compression nut 118 and the tertiary crossbar 120. The fourth crossbar 304 is preferably tubular in shape and of smaller diameter than the main crossbar 102. Turning the compression nut 306 in a counterclockwise direction, as shown by a counterclockwise arrow 207, will loosen the compression nut 306 from the threads 302 in a manner well-known in the art. Turning the compression nut 306 in a counterclockwise direction will tighten the compression nut 306 onto the threads 302. Prior to tightening the compression nut 306 onto the threads 302, the fourth crossbar is telescopically slidable within the main crossbar 102, as shown by a longitudinal arrow 308. In this manner, the fourth crossbar 304 is adjustable to a plurality of lengths relative to the main crossbar 102. This preferred embodiment of the present invention provides adjustablility of the attachment distance 108 between the clamp 104, which is now attached to the fourth crossbar, and the clamp 106, which is attached to the main crossbar 102. Moreover, the fourth crossbar 304 provides rotatable adjustment of the clamp 104 relative to the clamp 106. The compression nut 306 may be tightened onto the threads 302 to compress the main crossbar 102 against the fourth crossbar 304, thereby to restrict the slidable and rotatable adjustable positioning of the fourth crossbar 304 to a fixed position relative to the main crossbar 102.

2. Operation of the Preferred Embodiment

FIGS. 4 and 5 show the operation of the attachment bar 100 that is attached to a wheelchair 402 and receives a pole 502 of an intravenous container support apparatus 504. In FIG. 3, an enlarged view of the clamp 104 and main support 102 section of the attachment bar 100, as encircled by a broken line 404, shows the clamp 104 securely clamped around a first handle 406 located on the rear of the wheelchair 402. The main crossbar 102 extends between the first handle 406 to the second handle (not shown), where the clamp 106 securely clamps around the second handle, thereby to fixedly attach the attachment bar 100 to the wheelchair 402. The secondary crossbar 110 is positioned below the main crossbar 102 with the extension bars 112, 114, thereby to permit the tertiary crossbar 120 with the attached clamp 126 to extend outwardly from a first side of the wheelchair when the tertiary crossbar 120 is secured with the compression nut 118 on the threads 116. Alternatively, the tertiary crossbar 120 with the attached clamp 126 extends outwardly from a second side of the wheelchair when the tertiary crossbar 120 is secured with the compression nut 118 on the threads 117.

In FIG. 5, an enlarged view of the clamp 126 and tertiary crossbar 120 section of the attachment bar 100, as encircled by a broken line 506, shows the clamp 126 securely clamped around the pole 502 of the intravenous container support apparatus 504. In this manner, the intravenous container support apparatus 504 may quickly and effectively be securely attached to either side of a patient transportation apparatus, such as the wheelchair 402, with the present invention, thereby to minimize the number of health care personnel required to transport a patient and to minimize potential overturning and dangerous jolts which may dislodge intravenous lines positioned in the patient being transported.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated. It is intended that the scope of the present invention be broadly defined by the claims which follow.

What is claimed is:

1. An attachment device for removably securing an intravenous container support apparatus to a patient transportation apparatus, wherein said attachment device comprises:

a main support member having a main first end and a main second end;

a secondary support member fixedly attached in parallel to said main support member at a central position, wherein said secondary support member has a secondary first end and a secondary second end;

a tertiary support member that is telescopically slidable within said secondary support member;

main clamping means for removably clamping said main support member to said patient transportation apparatus, wherein said main clamping means is fixedly attached to said main first end and to said main second end;

secondary clamping means attached to said secondary support member for adjustably clamping said tertiary support member into a fixed position within said secondary support member; and tertiary clamping means attached to said tertiary support member for removably clamping said portable intravenous container support apparatus to said tertiary support member.

2. The attachment device according to claim 1, wherein the attachment device further comprises:

a fourth support member that is telescopically slidable within said main support member, whereby a length between said main clamping means that is fixedly attached to said fourth support member and said main second end is adjustable.

3. The attachment device according to claim 1 wherein said tertiary support member is rotatable within said secondary support member.

4. The attachment device according to claim 2 wherein said fourth support member is rotatable within said main support member.

5. The attachment device according to claim 1 that is constructed primarily of a lightweight metal alloy.

6. The attachment device according to claim 5, wherein said lightweight metal alloy comprises aluminum.

7. The attachment device according to claim 5, wherein said lightweight metal alloy comprises stainless steel.

8. The attachment device according to claim 1, wherein said tertiary support member further comprises:

a plurality of submembers; and a plurality of joint means for adjusting an angle between said tertiary support member and said plurality of submembers, wherein the plurality of joint means interconnects the plurality of submembers together.

9. The attachment device according to claim 1, wherein said main clamping means and said tertiary clamping means is a C-clamp which is hinged to open and close about a hinge pin and is secured with a thumbscrew.

10. The attachment device according to claim 1, wherein said secondary clamping means is a compression nut that encircles said tertiary support member and is rotatably threaded onto said secondary first end of said secondary support member.

11. An adjustable clamping brace for clamping an intravenous container support apparatus to a patient transportation apparatus, said brace comprises:

a base support member having a base first end and a base second end, wherein said base support member comprises a primary base tube that receives a secondary base tube in a telescopically slidable manner, thereby to permit said base support member to be adjustable in length;

base clamping means for removably clamping said base support member to the patient transportation apparatus, and wherein said base clamping means is attached to said base first end;

base locking means for preventing said secondary base tube from sliding within said primary base tube;

an intermediate support member having an intermediate first end and an intermediate second end, wherein said intermediate support member comprises a primary intermediate tube that receives a secondary intermediate tube in a telescopically slidable manner, thereby to permit said intermediate support member to be adjustable in length;

intermediate clamping means for removably clamping said intermediate support member to the intravenous container support apparatus, wherein said intermediate clamping means is attached to said intermediate first end;

intermediate locking means for preventing said secondary intermediate tube from sliding within said primary intermediate tube; and connection means for connecting said intermediate support member in parallel with said base support member.

12. The adjustable clamping brace according to claim 11 wherein said secondary base tube is member is rotatable within said primary base tube.

13. The adjustable clamping brace according to claim 11 wherein said secondary intermediate tube is rotatable within said primary intermediate tube.

14. The adjustable clamping brace according to claim 11 that is contructed primarily of a lightweight metal alloy.

15. The adjustable clamping brace according to claim 14, wherein said lightweight metal alloy comprises aluminum.

16. The adjustable clamping brace according to claim 14, wherein said lightweight metal alloy comprises stainless steel.

17. The adjustable clamping brace according to claim 11, wherein said secondary intermediate tube further comprises:

a plurality of tubular submembers; and a plurality of joint means for adjusting an angle between said secondary intermediate tube and said plurality of tubular submembers, wherein the plurality of joint means interconnects the plurality of tubular submembers together.

18. The adjustable clamping brace according to claim 11, wherein said base clamping means and said intermediate clamping means is a C-clamp which is hinged to open and close about a hinge pin and is secured with a thumbscrew.

* * * * *